(12) United States Patent
Ishizuka

(10) Patent No.: US 6,958,469 B2
(45) Date of Patent: Oct. 25, 2005

(54) DIFFRACTION GRATING INTERFERENCE SYSTEM ENCODER FOR DETECTING DISPLACEMENT INFORMATION

(75) Inventor: Ko Ishizuka, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 148 days.

(21) Appl. No.: 10/410,494

(22) Filed: Apr. 9, 2003

(65) Prior Publication Data
US 2003/0193017 A1 Oct. 16, 2003

(30) Foreign Application Priority Data
Apr. 12, 2002 (JP) .................................... 2002-110564

(51) Int. Cl.$^7$ .................. G01D 5/34; H01J 3/14
(52) U.S. Cl. ............. 250/231.16; 250/237 G; 356/496; 356/614; 341/31
(58) Field of Search ............ 250/231.13, 231.14, 250/231.16, 237 R, 237 G; 341/13, 31; 356/496, 521, 614, 498–499

(56) References Cited

U.S. PATENT DOCUMENTS

| | | | |
|---|---|---|---|
| 4,792,678 A | 12/1988 | Spies | |
| 5,666,196 A | * 9/1997 | Ishii et al. | 356/499 |
| 5,880,839 A | * 3/1999 | Ishizuka et al. | 356/499 |
| 5,981,941 A | 11/1999 | Takata et al. | |
| 6,635,863 B1 | * 10/2003 | Nihommori et al. | 250/231.13 |
| 2001/0017350 A1 | 8/2001 | Ishizuka | |

FOREIGN PATENT DOCUMENTS

JP 2-5127 1/1990

OTHER PUBLICATIONS

European Search Report; Place of Search Munich; Date of Search Jul. 4, 2003.

* cited by examiner

Primary Examiner—Stephone B. Allen
Assistant Examiner—Patrick J. Lee
(74) Attorney, Agent, or Firm—Morgan & Finnegan, LLP

(57) ABSTRACT

A displacement information detector in which a coherent luminous flux from a light source is applied to a diffraction grating scale adapted to be relatively moved to generate two diffracted rays of light having different orders, and the two diffracted rays of light are diffracted and deflected in a diffraction grating in which circular or toric curves are arranged in lattice at unequal pitches to be irradiated to the diffraction grating scale again to be rediffracted, and the diffracted rays of light are combined with each other to be made interfere each other, and the resultant interference light is introduced into a light receiving element to thereby detect a periodic signal due to the relative movement of the diffraction grating scale.

5 Claims, 4 Drawing Sheets

DIFFRACTION GRATING INTERFERENCE SYSTEM ENCODER FOR DETECTING DISPLACEMENT INFORMATION

BACKGROUND OF THE INVENTION

1. Field of the Invention

The present invention relates in general to a displacement information detector. In particular, the invention relates to a displacement information detector which is suitable for industrial measuring machines and the like, and which is capable of obtaining a physical amount of displacement information such as position information, rotation information or movement of a displaced object with high accuracy by utilizing the diffraction caused when the displaced object (optical scale) is irradiated with light.

2. Related Background Art

Heretofore, in order to detect displacement information such as position information, an amount of movement or an amount of rotation of an object (displaced object), many displacement information detectors (encoders) such as rotary encoders or linear encoders are used in industrial measuring machines and the like.

The applicant of the present invention has proposed the various encoders of the so-called grating interference system for detecting the fluctuation in position or velocity of an object by applying the diffraction interference phenomenon of light until now. In particular, the applicant of the present invention has proposed the encoder in which a fine scale of micron order is adopted, and two luminous fluxes diffracted by the fine scale are taken out to be made interfere each other to thereby obtain the much higher resolution than that of the encoder of a geometrical optics system.

These encoders adopt the construction in which the wave surfaces of two diffracted rays of light are composed to produce the interference pattern. However, since the encoders are of an interference optical system, the very strict accuracy is required for the processing and the arrangement of optical elements. In particular, in the case of the so-called embedded type encoder in which a scale portion and a detection head portion are separated from each other, a user must fit the scale and the detection head portion to a motor, a stage or the like, and hence the difficulty in assembly in the work thereof becomes a problem. In addition, in the case where such an encoder is fitted to the actual apparatus, a smaller encoder has been required along with the miniaturization of the apparatus itself.

Then, until now, the applicant of the present invention has proposed the encoder which is adapted to detect the highly accurate displacement information and which reduces the influence of the alignment error during the installation by utilizing a correction optical system adapted to correct the errors in assembly of various optical elements in Japanese Patent Application No. 2001-25124 for example.

FIG. 4 is a schematic view showing construction of a main portion of an optical system of an encoder which can detect displacement information with high accuracy by utilizing the correction optical system which the present applicant previously proposed.

In FIG. 4, a luminous flux R emitted from a semiconductor laser LD permeates through a partial transmission portion W of a beam splitter BS to be applied to a diffraction grating scale (scale grating) GT through a reflecting mirror M1 and a transmission portion of a toric (circular ring) element CG. The reflected and diffracted rays of light R+ and R− diffracted in the scale GT are applied to toric reflection gratings CG1 and CG2 of the toric element CG, respectively. Here, assuming that the grating pitch on the diffraction grating scale GT is P1, the grating pitch P2 of the toric reflection gratings CG1 and CG2 is set so as to meet the following relationship.

$$P2=P1/2$$

The toric reflection gratings CG1 and CG2 operate as the diffraction grating having the grating pitch P2 when viewed locally. Then, the luminous fluxes are diffracted to the original azimuth (on the diffraction grating scale GT side) to be applied to nearly the same position of the diffraction grating scale grating GT to be rediffracted, and then the luminous fluxes are combined with each other to trace the original path to be returned back to the beam splitter BS. The luminous fluxes are taken out in the direction different from the semiconductor laser LD in the reflection diffraction grating GT4 of the rear face of the beam splitter BS to be detected as the interference flux by a light receiving element PD4. By the way, in the case where ± primary diffracted rays of light are used, the light and darkness periods of the interference on the light receiving element PD correspond to four periods per movement for one pitch of the diffraction grating scale grating GT.

The encoder in this prior art example has the effect of correcting the optical path shift for the wavelength fluctuation of the light source due to the effect of the toric reflection gratings CG1 and CG2. Since the correction is also exerted on the alignment errors of the optical elements, even in the case of the encoder in which the scale grating GT and the detection head (PD4) are separated from each other, the installation thereof becomes relatively easy. In addition, since the number of constituent components or parts is very small, the miniaturization and thinness thereof become possible.

Assuming that the grating pitch on the diffraction grating scale GT is P1 in the encoder shown in FIG. 4, the pitch P2 of the toric reflection gratings CG1 and CG2 is set so as to meet the following relationship:

$$P2=P1/2.$$

Thus, in particular, when the diameter of the disk scale of the rotary encoder is made small, if the luminous flux illumination position is radially shifted, there is encountered a problem in that the pitch P2 becomes easy to be shifted from the setting.

Then, in particular, when a disk with a small diameter is used, there is desired a three grating interference optical system in which the stable displacement information independent of the shift of the flux illumination position in a radial direction is obtained.

SUMMARY OF THE INVENTION

In the light of the foregoing, the present invention has been made in order to solve the above-mentioned problems associated with the prior art, and it is, therefore, an object of the present invention to provide a small and thin displacement information detector which is capable of being suitably applied to a disk with a small diameter, utilizing a three grating interference optical system, and with which stable displacement information may be obtained with high resolution.

In order to attain the above-mentioned object, according to the present invention, there is provided a displacement information detector in which a coherent luminous flux from a light source is applied to a diffraction grating scale adapted to be relatively moved to generate two diffracted rays of light having different orders, and the two diffracted rays of light are diffracted and deflected in a diffraction grating in which circular or toric curves are arranged in lattice at unequal pitches to be applied to the diffraction grating scale again to be rediffracted, and the diffracted rays of light are combined with each other to be made interfere each other, and the resultant interference light is introduced into a light receiving element to thereby detect a periodic signal due to the relative movement of the diffraction grating scale.

The above and other objects as well as construction of the present invention will become clear by the following description of the preferred embodiments of the present invention.

DESCRIPTION OF THE PREFERRED EMBODIMENTS

The preferred embodiments of the present invention will hereinafter be described in detail with reference to the accompanying drawings.

Figure 1:
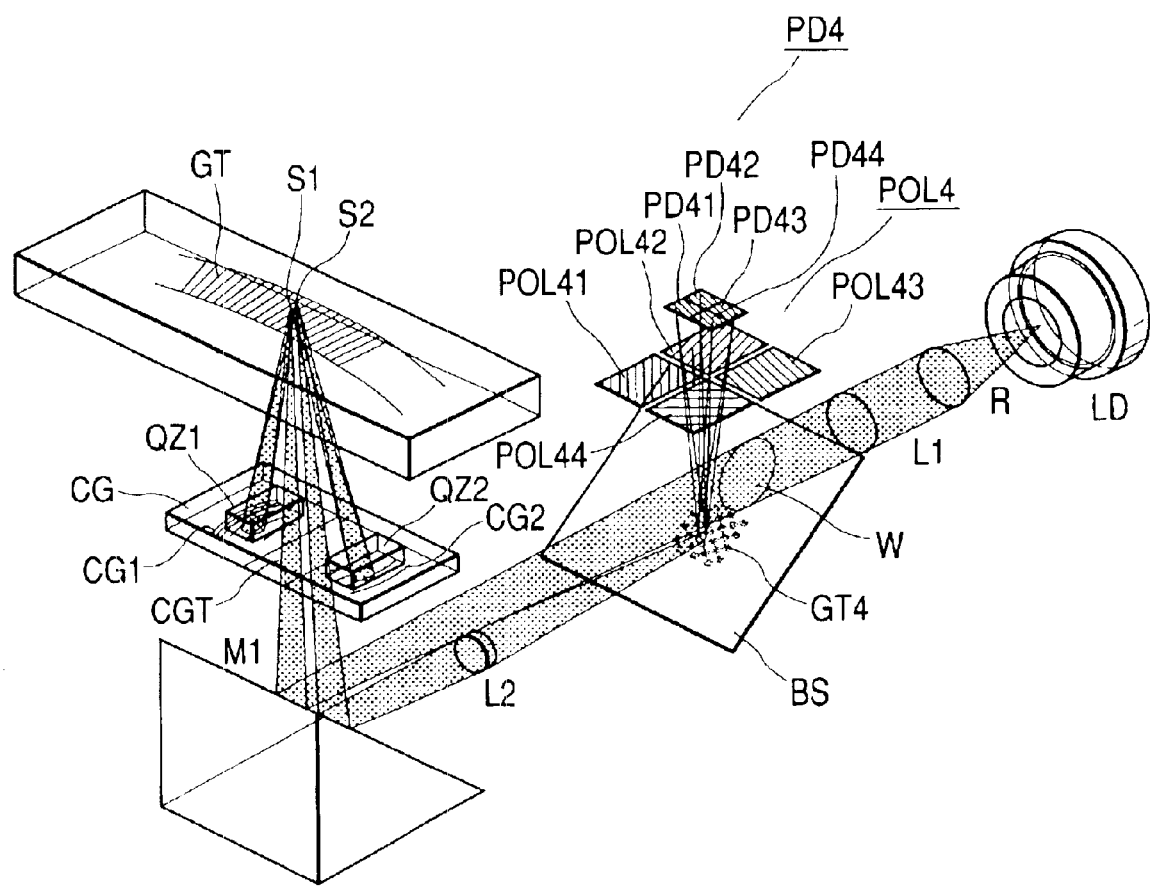
FIG. 1 is a schematic view showing optical construction of a main portion (direct condensing) according to a first embodiment of the present invention.

FIG. 1 is a schematic view showing construction of a main portion of an optical system according to a first embodiment when the present invention is applied to a rotary encoder.

In the present embodiment, there is shown a stable grating interference type encoder in which a luminous flux is condensed and applied to a circular reflection diffraction grating having a grating pitch suitably changed, and a grating scale.

In FIG. 1, a luminous flux R emitted from a semiconductor laser LD is condensed by a lens L1 to permeate through a partial transmission window W of a beam splitter BS having a reflecting film and the partial transmission window W to be made incident to a reflecting mirror M1 and a transmission portion CGT of a toric device (circular grating device substrate) CG.

The luminous flux which has permeated through the transmission portion CGT of the circular grating device substrate CG is applied nearly in the form of a spot on a point S1 of a radial diffraction grating scale GT used in a rotary encoder to be reflected and diffracted therein.

In the present embodiment, in order that the luminous flux may be applied nearly in the form of a spot on the grating scale GT, the luminous flux is given the direct condensing characteristics by a lens (collimator lens) L1 to be applied with the oblique incidence. The ± primary reflected and diffracted rays of light R+ and R− at this time are emitted in the form of the divergent bundle of rays from the diffraction grating scale GT to permeate through ⅛ wavelength plates QZ1 and QZ2 provided in the respect optical paths to be applied to the circular diffraction gratings CG1 and CG2, respectively, in each of which the grating pitch becomes finer as the place is located on the outer side (on the outer side in the radial direction).

Here, each of the circular diffraction gratings CG1 and CG2 is arranged under the condition in which the grating pitch is suitably changed, whereby the diffracted rays of light of a specific order which are diffracted and reflected again in the circular diffraction gratings (toric reflection gratings) CG1 and CG2 are applied again nearly in the form of a spot on a point S2 which is slightly different radially from the point S1 on the diffraction grating scale GT to be further diffracted.

Here, since in the rotary encoder of the present embodiment, the application positions of the luminous flux, i.e., the points S1 and S2 are slightly different radially from each other, the azimuths of the optical axes of the two luminous fluxes which have been rediffracted at the point S2 (the third diffraction) are slightly shifted. However, since both the luminous fluxes are the divergent bundles of rays when the point S2 is assumed to be the virtual point light source, the spherical wave surfaces of both the luminous fluxes agree with each other so that the interference state of the area in which the two luminous fluxes coexist becomes very stable.

The two luminous fluxes which have been rediffracted at the point S2 on the diffraction grating scale GT are combined with the greater part thereof to permeate through the transmission portion CGT and pass through the mirror M1 and then are given the condensing characteristics by the lens L2 to be returned back to the beam splitter BS.

In addition, since the two rediffracted luminous fluxes permeate in a round trip manner through the ⅛ wavelength plates QZ1 and QZ2 which are arranged so as to make an angle of 90 degrees with the optical axes thereof, the luminous fluxes become the circularly polarized luminous fluxes which turn in the directions opposite to each other. Then, if the two rediffracted luminous fluxes are composed with the polarization states thereof in terms of a vector, then the resultant light becomes the linearly polarized light the plane of polarization of which is rotated in accordance with the phase difference between the +primary diffracted light and the −primary diffracted light.

Then, the luminous flux introduced into the beam splitter BS is reflected and diffracted in a staggered phase grating GT4 recorded on the reflecting surface to be divided into four luminous fluxes to be supplied to polarization means POL4 composed of four polarizing elements POL41, POL42, POL43 and POL44 the polarization surfaces of which are oriented to the different azimuths in the front surfaces of the respective light receiving surfaces, and then the four luminous fluxes are detected by light receiving means (array of light receiving elements) PD4.

By the way, in the case where the ± primary diffracted rays of light are used, the change in light and darkness period of the interference obtained in the light receiving means PD4 corresponds to four periods per movement for one pitch of the scale grating GT. In addition, the light and darkness period signals obtained from the four light receiving elements of the light receiving means PD4 are sine waves and are out of phase with one another.

If the azimuths of the four polarizing elements are made 45 degrees out of phase with one another, then 90 degrees out-of-phase is obtained. By the way, while in the present embodiment, the number of light receiving elements is four, normally, even two or three light receiving elements may also be available.

As described above, in the present embodiment, the reflection diffraction gratings CG1 and CG2, each having a circular shape or the like, for which the pitch is suitably changed are combined with the condition in which the luminous flux is applied nearly in the form of a spot on the radial grating scale GT, whereby there is constructed an optical system optimal for the small and stable three grating interference type encoder having the high resolution.

In particular, in the present embodiment, the circular diffraction grating on the diffraction grating scale GT is made the reflection diffraction grating having a circular-shape or the like in which the equal pitch is not adopted, but the pitch is suitably changed, and further is combined with the suitable illumination condition, whereby the small encoder optical system having high resolution is constructed.

In the present embodiment, when the grating pitch of the grating scale GT is changed, the angle of diffraction of the diffracted ray of light is changed accordingly, so that the positions where the diffracted rays of light are to be made incident to the circular reflection diffraction gratings CG1 and CG2 are shifted. Then, the grating pitch intervals of the circular reflection diffraction gratings CG1 and CG2 are suitably arranged to thereby emit the reflected and diffracted rays of light to the original azimuth.

This, for example, is equivalent to the case where a reflection type diffraction grating mirror, a reflection type Fresnel lens, and a reflection type zone plate are arranged for the circular reflection diffraction grating so that the focal length thereof becomes nearly equal to the interval to the grating scale GT.

For example, when the Fresnel reflecting mirror is supposed as the circular reflection diffraction gratings CG1 and CG2, the interval between the grating scale GT, and the circular reflection diffraction gratings CG1 and CG2 is set twice as large as the so-called focal length of the circular reflection diffraction gratings CG1 and CG2. Thus, the desired optical effects are obtained. The optical path through which the luminous flux is made incident to the grating scale again is made agree with the original path to thereby obtain the usually stable interference information.

In the case of the rotary encoder of the present embodiment, the case where a disk (radial disk) is radially shifted corresponds to the case where the grating pitch of the diffraction grating to which the luminous flux is made incident is changed. Thus, from the same reason, the stable interference information is obtained.

While the direction of arrangement of the grating scale GT, and the azimuth of arrangement of the gratings in the positions of incidence of the luminous flux of the circular diffraction gratings CG1 and CG2 are perfectly parallel with each other in the absence of mounting error, the directions may make a certain angle with each other. In such cases, the ± primary luminous fluxes which have been rediffracted in the grating scale GT do not perfectly agree with each other, and hence are emitted to the different azimuths.

Then, the luminous flux is condensed in the form of a spot in the rediffraction position on the grating scale GT, and the wave surface of the luminous flux emitted therefrom becomes the spherical surface to emit the resultant divergent luminous flux. The optical axes of the main rays of light of the ± primary diffracted rays of light are shifted from each other as described above. However, since the rays of light hold the wave surface in common, the stable interference state of the so-called one color state is obtained as a whole. In the present embodiment, with respect to the mounting error of other members as well, the same effects are offered.

Figure 2:
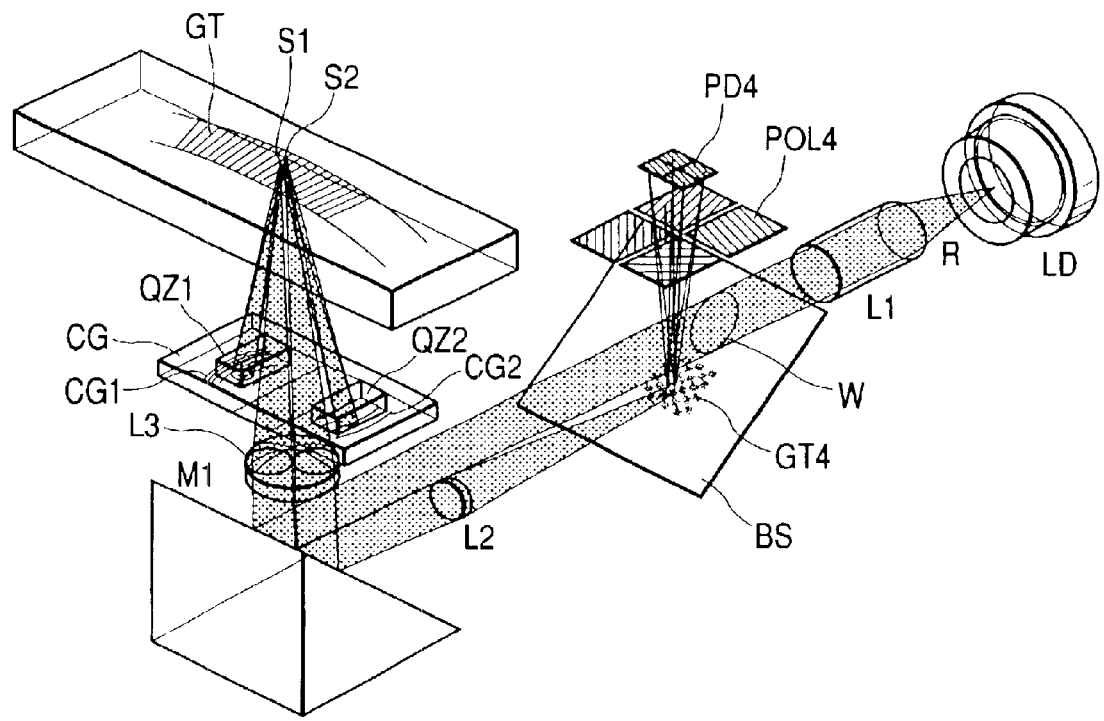
FIG. 2 is a schematic view showing optical construction of a main portion (lens condensing) according to a second embodiment of the present invention.

FIG. 2 is a schematic view showing construction of a main portion of a second embodiment of the present invention.

The present embodiment is different in construction from the first embodiment of FIG. 1 only in that a lens L3 is newly provided between the mirror M1 and the circular grating element substrate CG, and the other construction of the present embodiment is the same as that of the first embodiment.

In the present embodiment, the luminous flux emitted from the light source LD is given the condensing characteristics by the lens L1 and the lens L3 to be applied nearly in the form of a spot on the scale grating GT with the oblique incidence. As a result, the same effects as those of the first embodiment are offered.

Figure 3:
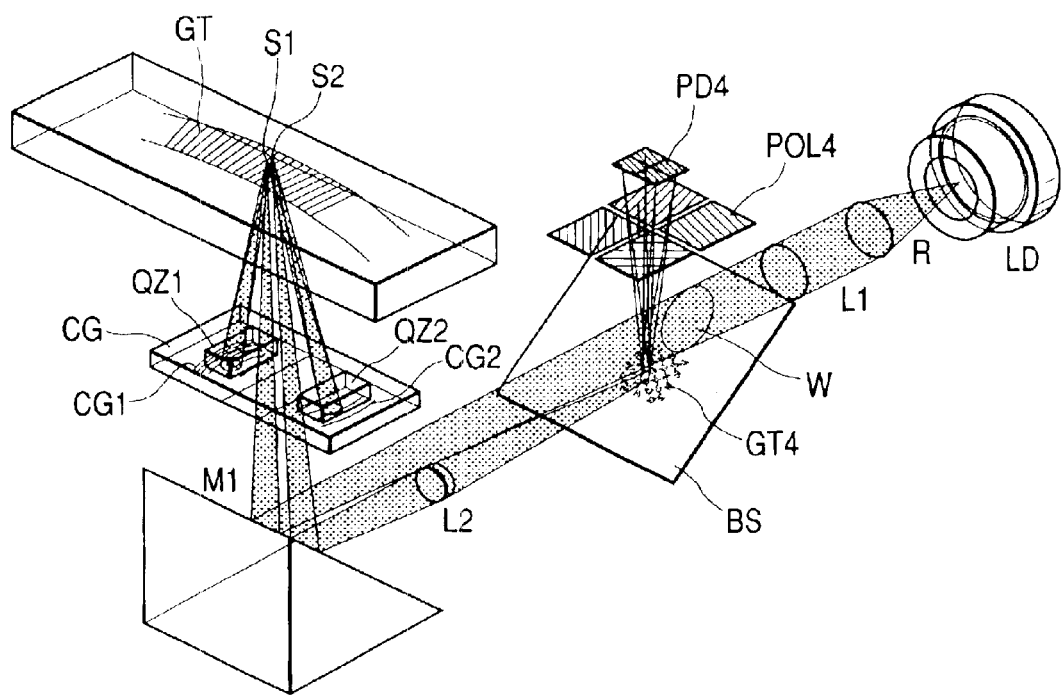
FIG. 3 is a schematic view showing optical construction of a main portion (when the illumination position is transversely moved) according to a third embodiment of the present invention.
Figure 4:
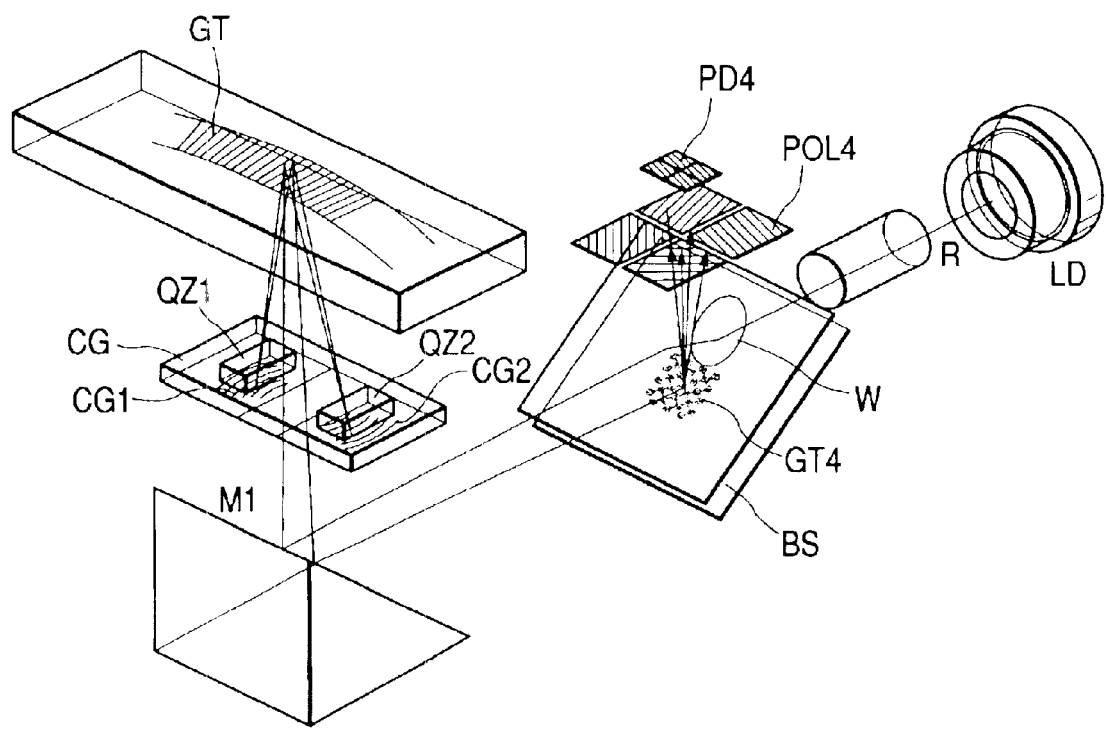
FIG. 4 is a schematic view showing construction of a main portion of a conventional encoder using a conventional circular reflection grating.

FIG. 3 is a schematic view showing construction of a main portion of a third embodiment of the present invention.

The present embodiment is different in construction from the first embodiment of FIG. 1 only in that instead of, when applying the luminous fluxes nearly in the form of spots on the grating scale GT, shifting the luminous fluxes radially to apply the luminous fluxes to the point S1 and the point S2 with the oblique incidence, the luminous fluxes are shifted in the direction of movement of the grating scale GT (in the circular direction) to be applied to the point S1 and the point S2, and other construction of the present embodiment is the same as that of the first embodiment. As a result, the same effects as those of the first embodiment are offered.

In the above-mentioned first to third embodiments, the grating scale GT is made a linear scale grating, and thus the present invention may be applied to a linear encoder.

There is unnecessary the rigorousness of the condition in which the luminous flux is applied nearly in the form of a spot on the grating scale GT through the lens L1 and the lens L3. In actual, the size of the beam waist is finite, and also the minimum condensing may be made back and forth in position more or less with respect to the grating scale GT.

According to the above-mentioned first to third embodiments, the circular reflection grating in which the grating pitch is suitably changed is used in the second diffraction grating CG of the three grating interference optical system, and the luminous flux is condensed and applied nearly in the form of a spot on the scale grating GT, whereby the following effects can be offered.

Even if the position where the luminous flux is applied to the radial grating on the disk for the rotary encoder with a small diameter is shifted due to the error during the mounting or the de-centering of the disk, the stable grating interference signal is obtained.

Since even if the grating pitch of the grating scale GT is changed, the detection can be stably carried out, encoders having the different numbers of pulses are realized with the disks having the same size (illumination radius).

Since even if the grating pitch of the grating scale is changed, the detection can be stably carried out, the so-called embedded type encoder is readily realized in which the disk and the optical detector are separated from each other.

Since the circular reflection grating is readily processed through the semiconductor process containing EB drawing, exposure, glass etching and the like, the circular reflection grating is excellent in mass production.

As set forth hereinabove, according to the present invention, it is possible to attain a small and thin displacement information detector which is capable of being suitably applied to a disk with a small diameter utilizing a three grating interference optical system and which is capable of obtaining stable displacement information with high resolution.

While the present invention has been particularly shown and described with reference to the preferred embodiments, it will be understood that the various changes and modifications will occur to those skilled in the art without departing from the scope and true spirit of the invention. The scope of the invention is, therefore, to be determined solely by the appended claims.

What is claimed is:

1. A displacement information detector, comprising:
   a diffraction grating scale adapted to be relatively moved;
   illumination means for illuminating the diffraction grating scale with a coherent luminous flux; and
   a diffraction grating having circular or circular arc curves arranged at unequal pitches and arranged so as to diffract and deflect two diffracted beams having different orders generated from the diffraction grating scale and to reirradiate the diffraction grating scale.

2. A displacement information detector according to claim 1, further comprising:
   light receiving means for receiving an interference luminous flux which is obtained by combining the two diffracted beams made incident to the diffraction grating scale again to be rediffracted in the diffraction grating scale.

3. A displacement information detector according to claim 1, wherein the luminous flux is applied nearly in the form of a spot on the diffraction grating with the illumination means.

4. A displacement information detector according to claim 1, wherein the diffraction grating is a diffraction grating lens, a Fresnel lens or a zone plate each having a focal length corresponding to a distance between the diffraction grating and the diffraction grating scale.

5. A displacement information detector, comprising:
   a diffraction grating scale adapted to be relatively moved;
   illumination means for illuminating the diffraction grating scale with a coherent luminous flux; and
   a diffraction grating having circular or circular arc curves arranged such that a pitch of the diffraction grating becomes finer toward outside and arranged so as to diffract and deflect two diffracted beams having different orders generated from the diffraction grating scale and to re-irradiate the diffraction grating scale.

* * * * *